Figures 1, 2:
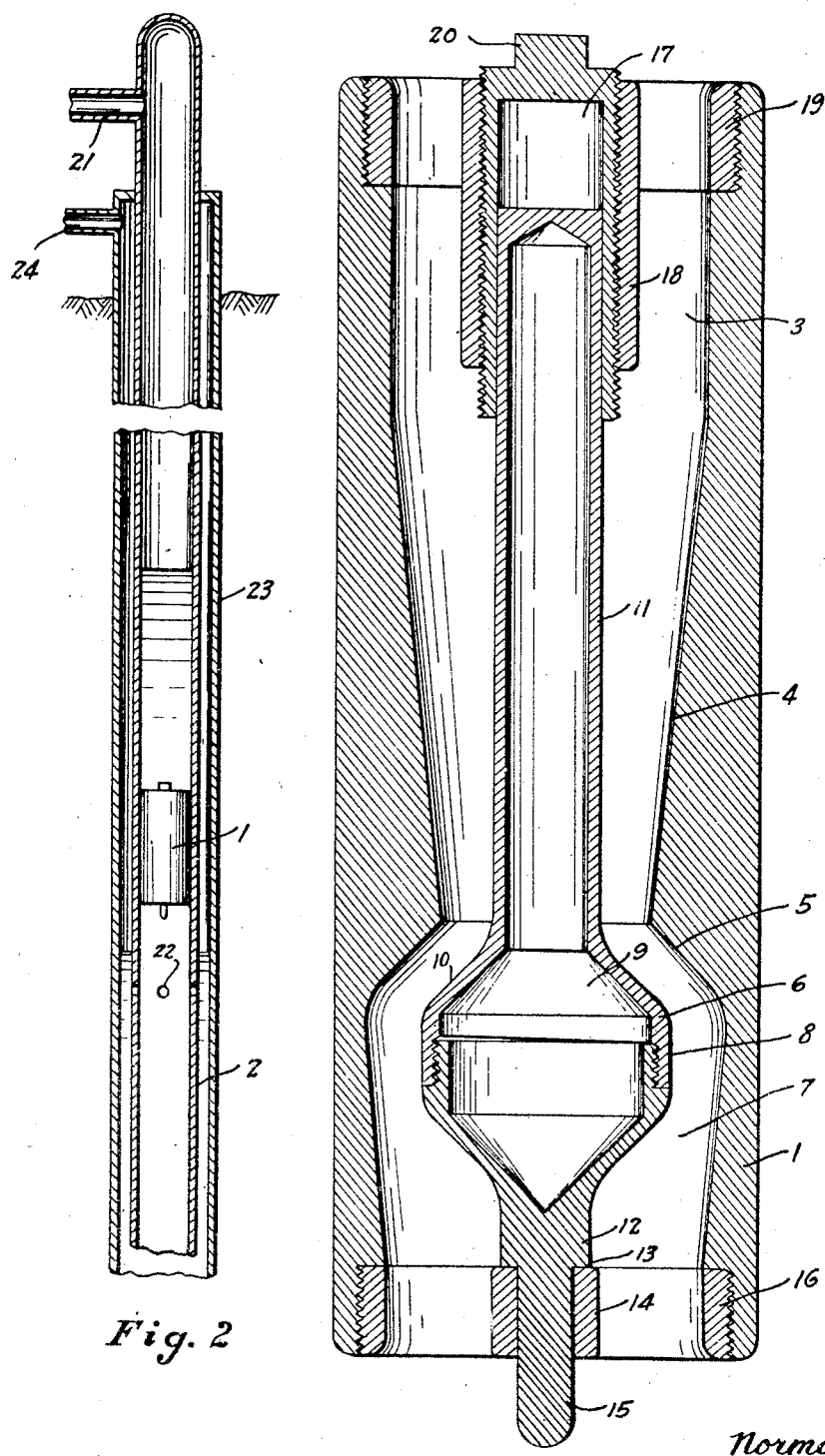

Dec. 15, 1931.  N. H. RICKER  1,836,871
WELL PUMPING SWAB
Original Filed Nov. 8, 1928

Norman H. Ricker
INVENTOR
BY Jesse R. Stone
ATTORNEY

Patented Dec. 15, 1931

1,836,871

UNITED STATES PATENT OFFICE

NORMAN H. RICKER, OF HOUSTON, TEXAS, ASSIGNOR TO HUGHES TOOL COMPANY, OF HOUSTON, TEXAS, A CORPORATION OF TEXAS

WELL PUMPING SWAB

Application filed November 8, 1928, Serial No. 317,904. Renewed October 16, 1930.

My invention relates to swabs or plungers to be used in raising liquid from wells. It has particular application to plungers whose length of stroke is from below the liquid level to the top of the well.

The swab is adapted to operate through the force of pressure fluid which may be introduced below the plunger to raise it and its superposed load of liquid to the surface where the load of liquid is discharged.

It is an object of the invention to provide a swab so constructed that the valve therein will close due to the the submergence of the swab below the level of the liquid in the well a predetermined distance.

It is also an object to provide a swab of the character mentioned which may be adjustable to close the valve at various depths below the liquid level where various loads are to be lifted by the swab.

It is my aim to provide a valve which will be automatically opened when the pressure thereon is relieved, and which is shaped to provide a minimum of resistance when the swab is falling through the fluid on its downward stroke.

In the drawings, Fig. 1 is a central longitudinal section through a swab made in accordance with my invention.

Fig. 2 is a broken vertical section of a well installation in which my swab may be used, said installation being shown somewhat diagrammatically.

The swab body 1 is cylindrical on its outer surface to fit within an eduction tube 2. It has a central fluid passage 3 therethrough which converges inwardly at 4 to a line spaced upwardly from the lower end where the wall again diverges to form a seat 5 for a valve 6. Below the valve seat is a valve chamber 7, which converges slightly toward the lower end.

The valve 6 is preferably hollow and is cylindrical at 8 where the upper and lower parts may be screwed together so as to leave access to the chamber 9 within the head of the valve. The upper end of the valve head is tapered at 10 to fit the seat 5 and has a hollow stem 11 connected therewith, said stem extending upwardly through the passage 3. The lower end of the valve is likewise tapered and terminates in a short guide stem 12, which is reduced in diameter at 13 to form a shoulder adapted to rest upon a guide ring 14 supported upon a threaded collar 16 secured in the lower end of the body. The stem 12 below the shoulder fits within the ring and projects below said ring to form a contact arm 15, by means of which the valve may be manually seated.

The upper end of the stem 11 forms a piston and fits within a cylinder 17, the outer surface of which is threaded for adjustment within a supporting nut or spider 18. Said nut 18 is supported upon a collar 19 screwed within the upper end of the body 1. The upper end of the cylinder 17 is closed and its upper end 20 is squared to receive a wrench whereby its position may be adjusted in the nut 18.

The stem 11 has a close sliding fit within the cylinder whose upper portion is filled with air or gas adapted to be compressed as the stem moves upwardly. The hollow chamber 9 in the head of the valve may be weighted by the introduction of small objects such as shot or by mercury or the like, so that the weight of the valve may be regulated.

The swab works in the eduction tube 2, which is closed at its upper end except for a discharge pipe 21 for the liquid. The tube has openings 22 at a point below the normal liquid level in the well, for inlet of the pressure fluid.

The tube 2 fits through the upper end of a casing or pipe 23 in the well, and said casing has an inlet 24 for pressure fluid at its upper end.

During operation, the swab is dropped into the tube until it is submerged. As it descends below the liquid level the pressure of the head of liquid above it will continue to increase and the buoyancy of the chamber 9 will move the valve upwardly compressing the air in the cylinder 17, and the swab will continue to fall until the static head of liquid is sufficient to force the valve to its seat. The weight of the valve and the position of the cylinder 17 may be adjusted so that the valve will be closed at the desired depth. When the valve is seated, the swab will stop and then air or gas introduced under pressure through the inlet 24 will depress the outer liquid level until the air will enter the openings 22 below the valve and force the swab upwardly with its load of liquid and discharge the liquid through the outlet 21. The plunger will pass the outlet allowing the air pressure to exhaust. The release of pressure below the valve will permit the valve to open under the pressure of condensed air in the cylinder 17, and the swab will again drop to repeat the operation.

The interior passage 3 of the swab and the outlines of the valve and valve stem have been formed particularly with the object of allowing a free passage of fluid therethrough as the swab drops with a minimum of eddying or turbulence in the fluid; the swab will then drop readily without great resistance until the valve closes under the liquid pressure.

The advantages of this type of swab lie in the fact that the valve will close at the desired level below the surface of the liquid without the use of a stop in the tubing and without springs or latches in the swab body. Furthermore, the level at which the valve can close may be easily adjustable.

Having thus described the invention, what I claim as new is:

1. A swab of the character described, including a cylindrical body having a fluid passage therethrough, a valve seat in said passage, an upwardly seating valve therein, and means tending to hold said valve normally open, said valve being closed by liquid when submerged therein a predetermined depth.

2. A swab of the character described, including a cylindrical body having a fluid passage therethrough, a valve seat in said passage, an upwardly seating valve therein, and pneumatic means tending to hold said valve normally open, said valve being constructed to be forced to closed position by a predetermined fluid pressure.

3. A swab of the character described, including a cylindrical body having a fluid passage therethrough, a downwardly diverging valve seat in said passage, a valve below said seat, means to guide said valve to and from said seat, said guide means including means tending to hold said valve in open position, said valve being responsive to fluid pressure to close when said pressure attains a predetermined value.

4. A swab of the character described, including a cylindrical body having a fluid passage therethrough, a valve seat in said passage, a valve in said seat, means to guide said valve to and from said seat, said guide means including means tending to hold said valve in open position, said valve being responsive to fluid pressure to close when said pressure attains a predetermined value.

5. A swab of the character described, including a cylindrical body having a fluid passage therethrough, a downwardly diverging valve seat in said passage, a valve below said seat, means to guide said valve to and from said seat, said guide means including pneumatically operated means tending to hold said valve in open position, said valve being responsive to fluid pressure to close when said pressure attains a predetermined value.

6. A swab of the character described, including a cylindrical body having a fluid passage therethrough, a valve seat therein, a valve shaped to fit said seat, a guide for said valve below said valve acting to limit its downward movement, an upwardly extending stem, and resilient means co-operating with said stem to hold said valve normally open.

7. A swab of the character described, including a cylindrical body, having a fluid passage therethrough, a valve seat therein, a valve shaped to fit said seat, a guide for said valve below said valve acting to limit its downward movement, an upwardly extending stem, and resilient means co-operating with said stem to hold said valve normally open, said resilient means being compressed by fluid pressure to allow said valve to close.

8. A swab of the character described, including a cylindrical body having a fluid passage therethrough, a valve seat therein, a valve shaped to fit said seat, a guide for said valve below said valve acting to limit its downward movement, an upwardly extending stem, a cylinder in said passage shaped to receive said stem and to include a pneumatic cushion above said stem.

9. A swab of the character described, including a cylindrical body having a fluid passage therethrough, a valve seat therein, a valve shaped to fit said seat, a guide for said valve below said valve acting to limit its downward movement, an upwardly extending stem, a cylinder in said passage, shaped to receive said stem and to include a pneumatic cushion above said stem, said cylinder being vertically adjustable.

10. A swab of the character described, including a cylindrical body having a fluid passage therethrough, a valve seat therein, a valve shaped to fit said seat, a guide for said valve below said valve acting to limit its downward movement, an upwardly extending stem, and resilient means co-operating with said stem, to hold said valve normally open, said valve having a chamber therein adapted to receive adjustable weights.

11. A swab having a valve therein, pneumatic means holding said valve normally open, and means responsive to a predetermined fluid pressure to close said valve.

In testimony whereof, I hereunto affix my signature this 31st day of October A. D. 1928.

NORMAN H. RICKER.